US007170868B2

(12) United States Patent
Phillips et al.

(10) Patent No.: US 7,170,868 B2
(45) Date of Patent: Jan. 30, 2007

(54) METHOD FOR PRESERVING WIRELESS RESOURCES IN A WIRELESS LOCAL AREA NETWORK

(75) Inventors: Joseph E. Phillips, Huntley, IL (US); Mario F. Derango, Wauconda, IL (US); Randy L. Ekl, Lake Zurich, IL (US); Michael H. Retzer, Palatine, IL (US)

(73) Assignee: Motorola, Inc., Schaumburg, IL (US)

( * ) Notice: Subject to any disclaimer, the term of this patent is extended or adjusted under 35 U.S.C. 154(b) by 19 days.

(21) Appl. No.: 10/772,832

(22) Filed: Feb. 5, 2004

(65) Prior Publication Data

US 2005/0174955 A1      Aug. 11, 2005

(51) Int. Cl.
*H04J 3/24* (2006.01)
(52) U.S. Cl. .................. 370/312; 370/390; 370/432
(58) Field of Classification Search ............... 370/338, 370/328, 390, 312, 432, 420; 455/517–518
See application file for complete search history.

(56) References Cited

U.S. PATENT DOCUMENTS

| | | | | |
|---|---|---|---|---|
| 5,570,366 A | * | 10/1996 | Baker et al. ............... | 370/312 |
| 6,473,413 B1 | * | 10/2002 | Chiou et al. ............... | 370/331 |
| 6,577,609 B1 | * | 6/2003 | Sharony ..................... | 370/312 |
| 6,847,620 B1 | * | 1/2005 | Meier ......................... | 370/328 |
| 2003/0039232 A1 | * | 2/2003 | Casati et al. ................ | 370/337 |
| 2004/0078566 A1 | * | 4/2004 | Barber et al. ............... | 713/161 |
| 2005/0025160 A1 | * | 2/2005 | Meier et al. ........... | 370/395.53 |

OTHER PUBLICATIONS

U.S. Appl. No. 60/252,717, filed Nov. 22, 2000.*
U.S. Appl. No. 60/252,717, filed Nov. 22, 2000.*

* cited by examiner

*Primary Examiner*—Ricky Q. Ngo
*Assistant Examiner*—Richard Chang
(74) *Attorney, Agent, or Firm*—Randi L. Karpinia; Indira Saladi

(57) ABSTRACT

In one embodiment of the present invention, an access point (111) receives a multicast packet intended for a particular multicast group. Upon receipt, the access point only rebroadcast the multicast packet over a wireless segment if it determines that there is at least one wireless subscriber unit (131) belonging to the particular multicast group and associated with the access point that did not originate the multicast packet. Optionally, if the multicast packet signals an automatic rebroadcast of the multicast packet over the wireless segment, the access point automatically rebroadcasts the multicast packet without determining whether there is at least one wireless subscriber unit belonging to the particular multicast group and associated with the access point that did not originate the multicast packet.

10 Claims, 3 Drawing Sheets

| SU | MULTICAST GROUP | ASSOCIATED |
|---|---|---|
| 123 | A | Y |
| 131 | B | Y |
| 130 | B | Y |
| 122 | A | N |
| 121 | A | N |
| 120 | A | N |
| 123 | C | Y |

PRESENCE TABLE 161

| SU | MULTICAST GROUP | ASSOCIATED |
|---|---|---|
| 120 | A | Y |
| 121 | A | Y |
| 122 | A | Y |
| 123 | A | N |
| 130 | B | N |
| 131 | B | N |
| 123 | C | N |

PRESENCE TABLE 160

US 7,170,868 B2

METHOD FOR PRESERVING WIRELESS RESOURCES IN A WIRELESS LOCAL AREA NETWORK

FIELD OF THE INVENTION

The present invention relates generally to preserving wireless resources in a wireless local area network ("WLAN").

BACKGROUND OF THE INVENTION

In a WLAN, each access point rebroadcasts all multicast packets over a wireless segment. This rebroadcast occurs regardless of whether there is a subscriber unit associated with the access point that is interested in receiving the multicast packets. If none of the subscriber units associated with the access point are listening to the rebroadcast (e.g., because the subscriber units associated with the access point belong to a different multicast group), the rebroadcast is a waste of the wireless resources/bandwidth.

Thus, there exists a need to preserve wireless resources/bandwidth by allowing the access point in a WLAN to only rebroadcast a multicast packet intended for a particular multicast group over a wireless segment if there is at least one receiving subscriber unit that is a member of the particular multicast group associated with the access point.

BRIEF DESCRIPTION OF THE FIGURES

A preferred embodiment of the invention is now described, by way of example only, with reference to the accompanying figures in which.

DETAILED DESCRIPTION OF THE PREFERRED EMBODIMENT

Figures 1, 2:
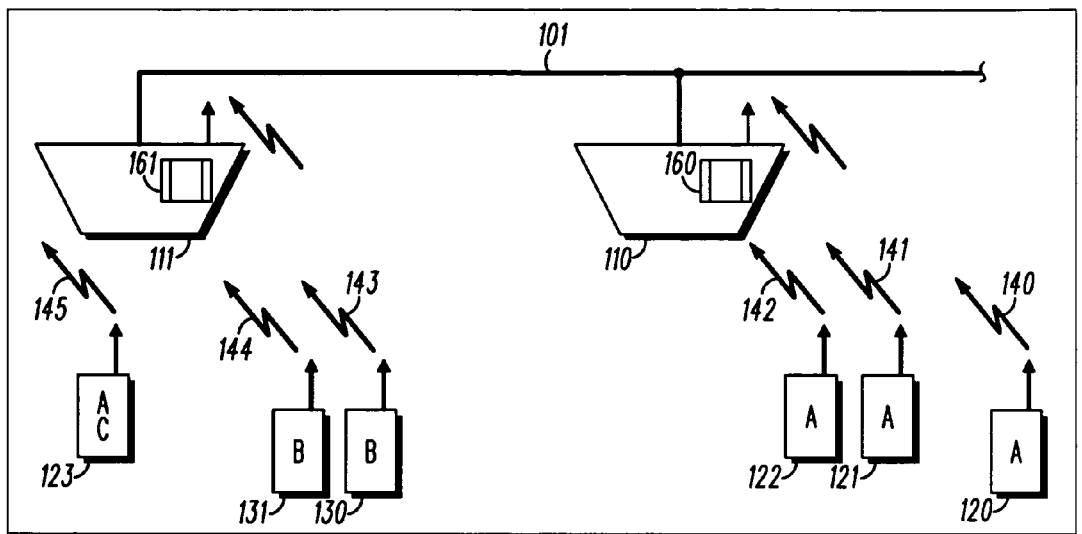
FIG. 1 illustrates a local area network depicting a wired segment and two wireless segments.
FIG. 2 illustrates examples of "presence" tables based on subscriber unit associations depicted in FIG. 1 in accordance with the present invention.

It will be appreciated that for simplicity and clarity of illustration, elements shown in the figures have not necessarily been drawn to scale. For example, the dimensions of some of the elements are exaggerated relative to each other. Further, where considered appropriate, reference numerals have been repeated among the figures to indicate identical elements.

The present invention discloses an access point for use in a wireless local area network ("WLAN") that rebroadcasts multicast packets for an intended multicast group over a wireless segment if there are members of the intended multicast group associated with the access point. If the sourcing subscriber unit for the multicast packets is a wireless subscriber unit that is associated with the access point, the access point only rebroadcasts the multicast packets over a wireless segment if there is at least one receiving subscriber unit associated with the access point and belonging to the intended multicast group. If, however, the sourcing subscriber unit associated with the access point desires a rebroadcast of a multicast packet over the wireless segment to measure and/or enhance the broadcast quality of the multicast packet, the sourcing subscriber unit signals the access point by indicating in the multicast packet (e.g., by setting a bit, setting a field, setting a value, setting an indicator, or the like) to automatically rebroadcast the multicast packet over the wireless segment even if there are no other members of the intended multicast group associated with the access point other than the sourcing subscriber unit. For ease of understanding and exemplary purposes only, the following describes the sourcing subscriber unit setting a bit in the multicast packet to indicate to the access point to rebroadcast the multicast packet, however, the present invention is not limited to such. Let us now describe the present invention in further detail by referring to the figures.

FIG. 1 depicts a local area network ("LAN") 100, which is composed of at least one wired segment 101 and at least two wireless segments 150, 151. The wireless segments 150, 151 incorporate a WLAN. Each wireless segment 150, 151 comprise an access point 110, 111, respectively, connected to the wired segment 101.

Subscriber units 120, 121, 122, 123, 130, 131 can communicate with each other using well-known packet protocols. For purposes of the following examples, it is desirable to define some group membership among the subscriber units. Group membership is determined prior to establishment of a group call by other procedures, such as radio service software or other techniques, typically known to those individuals ordinarily skilled in the art. Thus, for exemplary purposes only, subscriber units 120, 121, 122 and 123 belong to multicast group A, and subscriber units 130 and 131 belong to multicast group B. As such, group communications between one group of members (e.g., multicast group A) can proceed transparently and uninterrupted by group communications from another group of members (e.g., multicast group B). Group communications, such as dispatch, is accomplished by broadcasting multicast packets over the LAN 100.

It should be noted that while FIG. 1 depicts only one wired segment, two wireless segment, two access points, and six subscriber units, a practical network may include a plurality of each.

In a typical operation, when a subscriber unit powers up, it associates with a particular access point and joins a particular multicast group by transmitting an internet group management protocol ("IGMP") JOIN message to the access point as typically known to those individuals ordinarily skilled in the art. The access points 110, 111 detect IGMP JOIN messages. Each access point 110, 111 receives/sniffs the IGMP JOIN messages from the subscriber units in the LAN/WLAN and forms/updates its "presence" table. An example of the "presence" tables 160, 161 for access point 110, 111, respectively, based on FIG. 1 is illustrated in FIG. 2. The "presence" table can be any type of storage medium in which its entries/contents can be modified/updated and retrieved by the access point. Each "presence" table comprises a list of subscriber units along with the multicast group(s) in which each subscriber unit belongs and whether the subscriber unit is currently associated with that access point.

Each access point 110, 111 can also monitor LEAVE CONFIRM and CREATE messages for updating their "presence" tables 160, 161 as required by the local network procedures. These additional IGMP messages could be required if subscriber units typically join and leave multicast groups by changing their talkgroup affiliation by rotating their talkgroup selector or menu selection of different talkgroup affiliations. Thus, the access point updates the association of a subscriber unit once associated to it in its "presence" table (i.e., updating its "presence" table to indicate the subscriber unit is not currently associated with the access point) after Inter-Access Point Protocol (IAPP) procedures indicate that the subscriber unit has moved to another access point; updating the "presence" table to reflect the de-association with the access point prevents the need for the subscriber unit to re-join the multicast group when it associates to another access point. Optionally, the access point may further update its "presence" table by removing an entry from its "presence" table based on inactivity from a wireless subscriber unit after a predetermined period of time has lapsed.

It should be noted that it is possible for a subscriber unit to belong to more than one multicast group simultaneously. If a subscriber unit does belong to more than one multicast group simultaneously, multiple entries in the presence table(s) need to be updated. For example subscriber unit 123 belongs to multicast group A as well as multicast group C. This is indicated by the entries for subscriber unit 123 in "presence" tables 160 and 161.

Thus, in accordance with the present invention, when an access point receives a multicast packet for an intended multicast group, the access point only rebroadcasts the multicast packet over the wireless segment (i.e., over the air) if there is at least one receiving subscriber unit, other than the sourcing subscriber unit, associated with the access point and belonging to the intended multicast group. This is especially useful when group dispatch broadcasts are being sent with multicast packets. It is important to note that when the access point receives, from over the air, the multicast packet for an intended multicast group, the access point always rebroadcasts the multicast packet over the wired segment 101.

Optionally, if the sourcing subscriber unit desires to measure and/or enhance the broadcast quality of the multicast packets, the sourcing subscriber unit signals the access point by indicating in the multicast packets (e.g., by setting a bit) to rebroadcast the multicast packets even if there are no other members of the intended multicast group associated with the access point. Thus, when the access point receives a multicast packet with this bit set for rebroadcast, the access point automatically rebroadcasts the multicast packet over the wireless segment without a need to consult its "presence" table. As always, the access point also rebroadcasts the multicast packets over the wired segment 101. Any access point that receives the multicast packets from the wired segment 101 consults its "presence" table to determine whether it should rebroadcast the multicast packet over the wireless segment as described above. Thus, the access point in which the sourcing subscriber unit is associated with is the only access point that will rebroadcast the multicast packet based on the bit being set; all other access points consult their respective "presence" table to determine whether rebroadcast of the multicast packet is required in accordance with the present invention.

Figure 3:
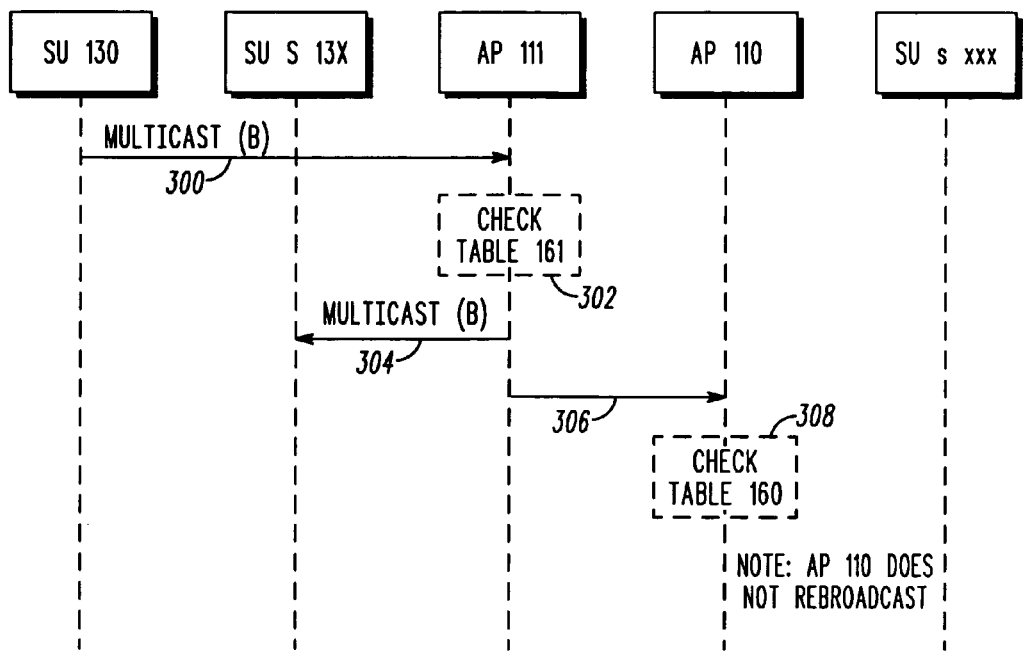
FIG. 3 illustrates a message sequence flow diagram depicting a first example of the present invention.

Let us now refer to a few examples of system operation to describe the present invention. In a first example illustrated in FIG. 3, the sourcing subscriber unit 130 on the WLAN generates multicast packets (e.g., dispatch voice) for group B. The multicast packets are transmitted over the wireless segment 151 to the access point 111 (at step 300). Upon receipt of the multicast packets, the access point 111 identifies the multicast group for which the multicast packets are intended and determines whether there is at least one receiving subscriber unit (i.e., an additional subscriber unit other than the source subscriber unit 130) associated with the access point 111 and belonging to multicast group B by consulting its "presence" table 161 (at step 302). Since the subscriber unit 131 is associated with the access point 111 and belongs to multicast group B, the access point 111 follows normal WLAN procedures and rebroadcasts the multicast packets back over the wireless segment 151 (at step 304). Additionally, the access point 111 rebroadcasts the multicast packets over the wired segment 101 (at step 306).

Upon receipt of the multicast packets from the wired segment 101, the access point 110 determines whether there is at least one receiving subscriber unit associated to it 110 and belonging to multicast group B by consulting it "presence" table 160 (at step 308). In this example, there are no subscriber units associated with the access point 110 and also belonging to multicast group B. Since there are no members of multicast group B associated with the access point 110, the access point 110 does not rebroadcast the multicast packets over the wireless segment 150, thus preserving wireless link resources/bandwidth.

Figure 4:
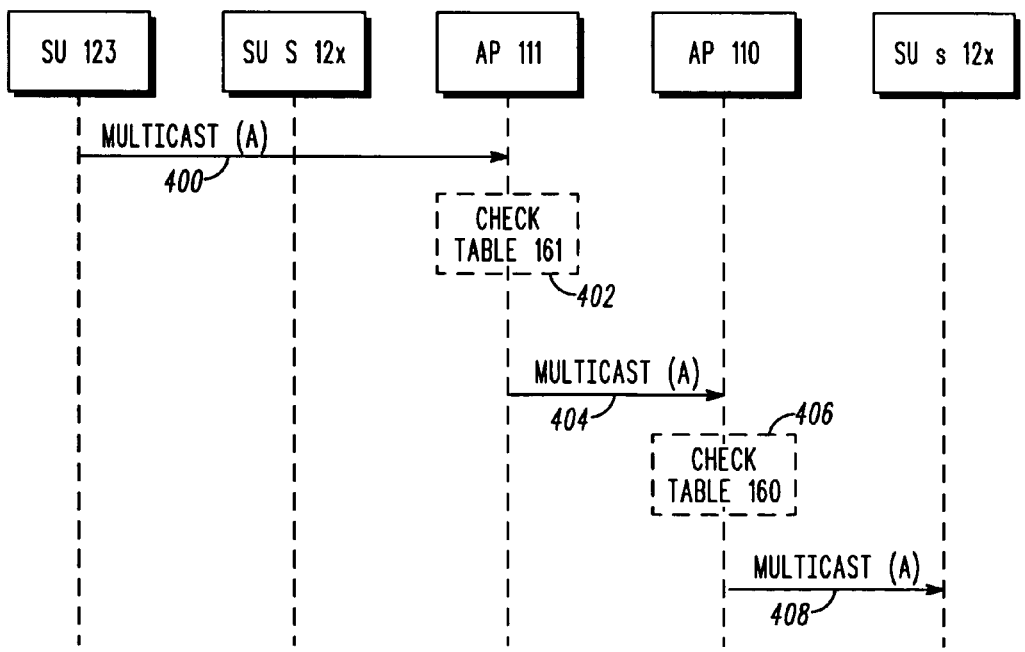
FIG. 4 illustrates a message sequence flow diagram depicting a second example of the present invention.

In a second example illustrated in FIG. 4, the sourcing subscriber unit 123 on the WLAN generates multicast packets for multicast group A. The multicast packets are transmitted over the wireless segment 151 to the access point 111 (at step 400). Upon receipt of the multicast packets, the access point 111 identifies the multicast group for which the multicast packets are intended (in this example, multicast group A) and determines whether there is at least one receiving subscriber unit associated with the access point 111 and belonging to multicast group A by consulting its "presence" table 161 (at step 402). Since subscriber unit 123 is the only member of multicast group A associated with the access point 111 (i.e., there are no receiving subscriber units associated with the access point 111 and belonging to multicast group A), the access point 111 does not rebroadcast the multicast packets back over the wireless segment 151, thus preserving wireless link resources/bandwidth in accordance with the present invention. As such, the access point 111 only rebroadcasts the multicast packets over the wired segment 101 (at step 404).

Upon receipt of the multicast packets from the wired segment 101, the access point 110 determines whether there is at least one receiving subscriber unit associated to it 110 and belonging to multicast group A by consulting its "presence" table 160 (at step 406). In this example, the access point 110 determines that there is at least one receiving subscriber unit associated with the access point 110 and also belonging to multicast group A (in this example, subscriber units 120, 121 and 122). As such, the access point 110 rebroadcasts the multicast packets over the wireless segment 150 (at step 408).

Figure 5:
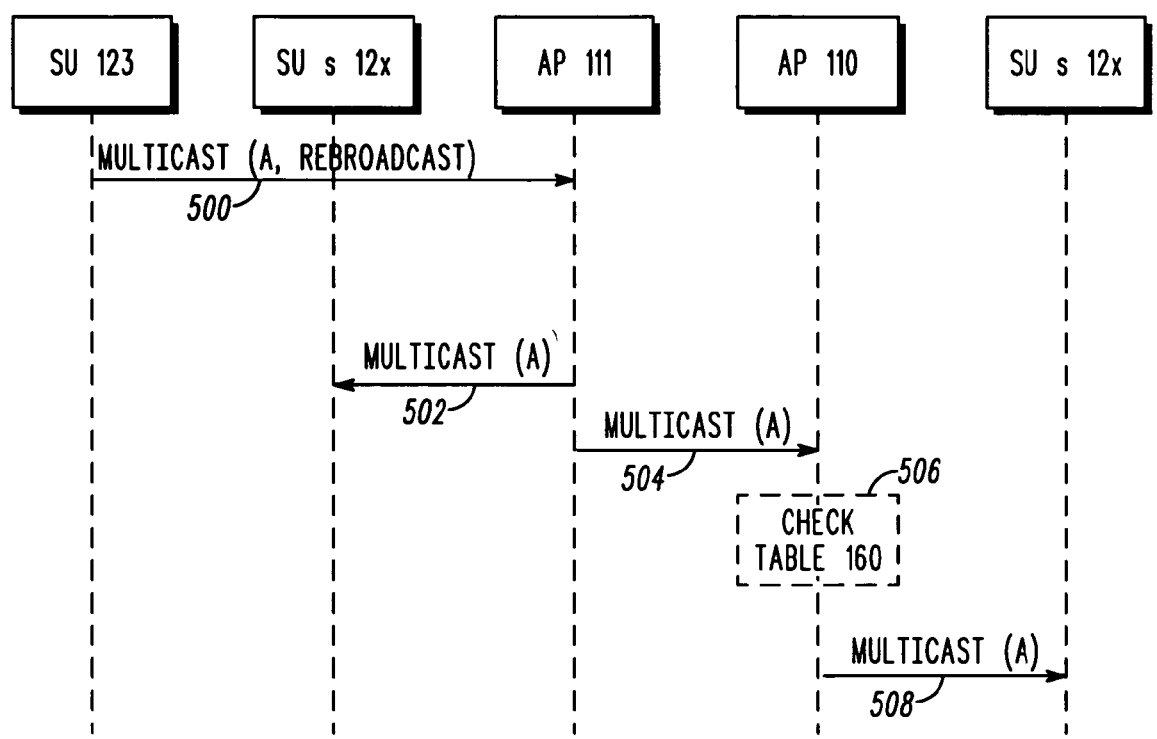
FIG. 5 illustrates a message sequence flow diagram depicting a third example of the present invention.

The third and final example is very similar to the second example. In the third example illustrated in FIG. 5, however, the sourcing subscriber unit 123 on the WLAN desires to receive the multicast packets it transmits to measure the quality of the multicast packets. As a result, when the sourcing subscriber unit 123 generates the multicast packets for multicast group A, it sets a bit in each packet for rebroadcast by its access point 111. The multicast packets are then transmitted over the wireless segment 151 to the access point 111 (at step 500). In this example, upon receipt of the multicast packets, the access point 111 identifies that the bit in the multicast packets is set for rebroadcast. Upon detection that the bit for rebroadcast is set, the access point 111 automatically rebroadcast the multicast packets over the wireless segment 151 without consulting its "presence" table 161 (at step 502); in other words, since the bit is set for rebroadcast, the access point 111 rebroadcasts the multicast packets over the wireless segment 151 regardless whether there are other members of multicast group A associated with the access point 111 other than sourcing subscriber unit 123.

Additionally, the access point 111 rebroadcasts the multicast packets over the wired segment 101 (at step 504). Upon receipt of the multicast packets from the wired segment 101, the access point 110 consults its "presence" table to determine whether rebroadcast over the wireless segment 150 is necessary as described above in the second example. As noted above, the access point 110 disregards the fact that the bit for rebroadcast was previously set by the sourcing subscriber unit 123. In accordance with the present invention, setting the bit for rebroadcast only signals the access point associated with the sourcing subscriber unit 123 (in this example, access point 111) to automatically rebroadcast the multicast packet without consulting its "presence" table; all other access points 110 must consult their respective "presence" table prior to rebroadcasting the multicast packet over the wireless segment 150.

While the invention has been described in conjunction with specific embodiments thereof, additional advantages and modifications will readily occur to those skilled in the art. For example, an access point may receive a multicast packet intended for all subscriber units in the network, not just for a particular multicast group. If the access point, after consulting its "presence" table, determines that there are no subscriber units currently associated to it, the access point does not rebroadcast the general multicast packet. The invention, in its broader aspects, is therefore not limited to the specific details, representative apparatus, and illustrative examples shown and described. Various alterations, modifications and variations will be apparent to those skilled in the art in light of the foregoing description. Thus, it should be understood that the invention is not limited by the foregoing description, but embraces all such alterations, modifications and variations in accordance with the spirit and scope of the appended claims.

Moreover, the term "a" or "an", as used herein, are defined as one or more than one. The term "plurality", as used herein, defined as two or more than two. The term "another", as used herein, is defined as at least a second or more. The terms "including" and/or "having", as used herein, are defined as comprising (i.e., open language).

We claim:

1. A method of message communication management within a communication network, the method comprising the steps of:
   forming one or more multicast groups comprising one or more subscriber devices operating within the communication network;
   at an access point:
   receiving information about the formed one or more multicast groups;
   storing a presence table comprising a list of wireless subscriber units along with their membership to at least one multicast group and whether the subscriber unit is associated with the access point using the received information;
   updating the presence table upon receipt of an internet group management protocol (IGMP) join message, wherein the IGMP message comprises information about a multicast group that a first subscriber is joining;
   receiving a multicast packet intended for a particular multicast group;
   determining by consulting the presence table whether there is at least one wireless subscriber unit belonging to the particular multicast group and whether the at least one wireless subscriber unit is currently associated with the access point; and
   rebroadcasting the multicast packet over a wireless segment only if there is at least one wireless subscriber unit belonging to the particular multicast group and associated with the access point.

2. The method of claim 1 further comprising the step of rebroadcasting the multicast packet over a wired segment.

3. The method of claim 1 further comprising the step of updating the presence table by detecting Internet Group Management Protocol (IGMP) messages from wireless subscriber units.

4. The method of claim 1 further comprising the step of updating the presence table by receiving Inter-Access Point Protocol (IAPP) messages from at least a second access point.

5. The method of claim 1 further comprising updating the presence table by removing an entry from the presence table based on inactivity from a wireless subscriber unit after a predetermined period of time lapses.

6. The method of claim 1 wherein the step of rebroadcasting occurs if there is at least one wireless subscriber unit belonging to the particular multicast group and associated with the access point that did not originate the multicast packet.

7. A method comprising the steps of:
   at an access point:
   receiving an internet group management protocol (IGMP) message, wherein the IGMP message comprises information about a particular multicast group to update a storage medium with information about multicast groups, wherein the storage medium comprises a list of wireless subscriber units along with their membership to at least one multicast group and whether the subscriber unit is associated with the access point;
   wirelessly receiving a multicast packet intended for a particular multicast group;
   rebroadcasting the multicast packet over a wired segment; and
   rebroadcasting the multicast packet over a wireless segment if the multicast packet signals an automatic rebroadcast of the multicast packet over the wireless segment; otherwise, rebroadcasting the multicast packet over the wireless segment if there is at least one wireless subscriber unit belonging to the particular multicast group and associated with the access point that did not originate the multicast packet determined by consulting the storage medium.

8. The method of claim 7 wherein a bit in the multicast packet signals the automatic rebroadcast of the multicast packet.

9. The method of claim 7 wherein a field in the multicast packet signals the automatic rebroadcast of the multicast packet.

10. The method of claim 7 wherein the multicast packet is originated from a wireless subscriber unit.

* * * * *